Patented Jan. 15, 1924.

1,481,040

UNITED STATES PATENT OFFICE.

MAURICE C. TAYLOR, ROBERT B. MacMULLIN, AND RALPH E. GEGENHEIMER, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF HYPOCHLORITES.

No Drawing. Application filed June 27, 1923. Serial No. 648,125.

*To all whom it may concern:*

Be it known that we, MAURICE C. TAYLOR, ROBERT B. MacMULLIN, and RALPH E. GEGENHEIMER, citizens of the United States, residing at Niagara Falls, county of Niagara, State of New York, have invented certain new and useful Improvements in the Manufacture of Hypochlorites; and we do hereby declare the following to be a full, clear, and exact description of the invention, such as will enable others skilled in the art to which it appertains to make and use the same.

This invention relates to improvements in the manufacture of hypochlorites, and more particularly in the manufacture of calcium hypochlorite.

In the prior application, Ser. No. 546,854, filed March 25, 1922, there is described and claimed an improved method of producing hypochlorites, and particularly calcium hypochlorite, by extracting hypochlorous acid from aqueous solutions containing chlorides, and causing the extracted hypochlorous acid to react with alkaline substances such as hydroxides of the alkali or alkali-earth metals to form the hypochlorite of the alkali or alkali-earth metals. The present invention relates to improvements upon the process of said prior application.

In the process specifically described in said prior application, after the hypochlorous acid has been extracted and the extract caused to react, e. g. with lime, to form calcium hypochlorite, the calcium hypochlorite is extracted with water to separate it from the excess lime and to form a saturated aqueous solution from which the dry solid calcium hypochlorite is recovered by evaporation.

In the specific example of said prior application there is described the treatment of the solution containing the hypochlorous acid with hydrated lime, using an excess of lime so that only a part of the lime reacts with the extracted hypochlorous acid.

In the improved method of the present invention the amount of the alkaline substance, e. g. lime, employed for reaction with the extract is insufficient to combine with all of the available hypochlorous acid, so that an excess of hypochlorous acid is present. When such an excess of hypochlorous acid is used and sufficient water is present, we have found that the calcium hypochlorite can be directly obtained without the necessity of extracting it with water and subsequently evaporating the resulting solution. In the improved process of the present invention, accordingly, the expensive steps of extraction with water and subsequent evaporation are eliminated with resulting reduction in the number of operations required in the process and corresponding reduction in the difficulty and expense of operation of the process.

The production of hypochlorous acid solution may be carried out as described in said prior application, for example, by adding chlorine to water in the presence of an alkaline substance which will react with the hydrochloric acid formed by the hydrolysis of chlorine without reacting with the hypochlorous acid. A solution of hypochlorous acid may thus be prepared by passing chlorine into water containing ground limestone or precipitated chalk in suspension, thus giving a solution containing hypochlorous acid and calcium chloride.

From such a solution the hypochlorous acid can be extracted or separated with a solvent or solvent mixture of the character set forth in said prior application, thus giving an extract of hypochlorous acid in the solvent which is substantially free from chlorides. A solvent mixture comprising carbon tetrachloride with 2% by volume of ethyl alcohol can thus be used, as described in said prior application.

We have found it more advantageous, however, to produce a hypochlorous acid solution containing a higher concentration of available chlorine and to subject the resulting chlorinated solution to evacuation before extracting the hypochlorous acid with the solvent. We have also found that the concentration of the alcohol in the carbon tetrachloride may advantageously be increased. e. g. to about 5%.

The invention will be further illustrated by the following specific example.

A suspension of calcium carbonate in water is chlorinated until it contains 25–35 grams of available chlorine per liter. It is then subjected to a vacuum whereby some free chlorine and nearly all of the carbon dioxide are removed, thus reducing the calcium chlorine and carbonate, respectively, in the final product. Three volumes of this evacuated solution are then agitated with a solvent solution made up of one volume of carbon tetrachloride containing about 5% alcohol. A solution or extract is thus obtained containing about 50 grams available chlorine per liter which solution is drawn off and treated with lime, using high grade hydrated lime containing 1-3% of free water, and treating this lime with a quantity of the solvent solution sufficient to give an excess of 30-40% available chlorine over that required theoretically to react with all the lime. In order to induce maximum conversion of the lime and at the same time obtain a powdery product, water is added in such amounts that the total free water present amounts to from 1½ to 2 times the theoretical amount of water required to form the trihydrate of calcium hypochlorite $(Ca(OCl)_2.3H_2O)$. The water is added very slowly with thorough agitation.

When the excess solution has been filtered off, a powdery product remains made up essentially of hydrated hypochlorite and containing, for example, 50% of calcium hypochlorite, about 42% of water, about 1% each of calcium carbonate and calcium chloride, and about 6% of hydrated lime. When this product is dried it forms a stable hypochlorite product similar to that described in our prior application.

It will thus be seen that the improved process of the present invention eliminates the extraction of calcium hypochlorite from a composite product containing calcium hydroxide, and also eliminates the evaporation of the resulting solution, and produces directly a calcium hypochlorite product which on drying is suitable for use.

The present process presents the further advantage that a higher concentration of available chlorine in the chlorinated carbonate suspension is employed; while the subjection of the chlorinated carbonate solution to evacuation reduces the amount of calcium carbonate and chloride in the final product. The use of a solvent solution containing an increased concentration of alcohol enables an increased amount of the hypochlorous acid to be dissolved in the solvent solution or combined therewith, thus reducing the amount of the solvent solution required for reaction with the hydrated lime. With this solution of increased content of available chlorine, an excess of available chlorine can be used in the lime treatment step without using an excessive amount of the solution.

We have further found that in carrying out of the process a considerable latitude in the temperature is permissible, e. g., from about zero degrees to about 30° C. without materially affecting the quality of the product.

In referring to the solvent solution employed for extracting the hypochlorous acid, we use the terms "solvent" and "solvent solution" to include solutions which may form compounds with the hypochlorous acid and hold the hypochlorous acid in solution in the form of such compounds; and in referring to the solutions containing extracted hypochlorous acid, we use the term "extract" to include solutions which may contain available chlorine as hypochlorous acid or as compounds of hypochlorous acid.

We claim:

1. The method of producing hypochlorites of alkali and alkali-earth metals which comprises causing an extract of hypochlorous acid in an organic solvent to react with the hydroxide of the metal, the amount of available chlorine being in excess of that theoretically required to react with the hydroxide.

2. The method of producing calcium hypochlorite which comprises causing an extract of hypochlorous acid and an organic solvent to react with hydrated lime, the amount of the extract being in excess of that theoretically required to convert all of the lime into hypochlorite.

3. The method of producing hypochlorites of alkali and alkali-earth metals which comprises extracting hypochlorous acid from aqueous solutions containing from 25-35 grams of available chlorine per liter, said extraction being effected with a solvent forming an extract substantially immiscible with water, and causing the resulting extract to react with the hydroxide of the metal to form the hypochlorite.

4. The method of producing calcium hypochlorite which comprises extracting hypochlorous acid from aqueous solutions containing from 25-35 grams of available chlorine per liter, said extraction being effected with a solvent forming an extract substantially immiscible with water, and causing the resulting extract to react with hydrated lime to form calcium hypochlorite, the extract being used in excess of the amount theoretically required to react with the lime.

5. The improvement in the extraction of hypochlorous acid from aqueous solutions which comprises treating such solutions with a solvent comprising carbon tetrachloride containing about 5% of alcohol.

6. In the manufacture of hypochlorites the step which comprises chlorinating a suspension of calcium carbonate until the resulting solution contains about 25-35 grams of available chlorine per liter, and then subjecting such solution to a vacuum.

7. The improvement in the manufacture of hypochlorites which comprises chlorinating a suspenson of calcium carbonate in water, subjecting the resulting solution to a vacuum, and extracting the hypochlorous acid from the resulting solution with an organic solvent.

8. The improvement in the manufacture of calcium hypochlorite which comprises subjecting hydrated lime to the action of an extract of hypochlorous acid in an organic solvent, the amount of the solvent being sufficient to give an excess of about 30–40% available chlorine over that theoretically required to react with the lime.

9. The improvement in the manufacture of calcium hypochlorite which comprises subjecting hydrated lime to the action of an extract of hypochlorous acid in an organic solvent, the extract being used in excess of the amount required theoretically to react with all the lime, and water being added in such amount that the total free water present amounts to from $1\frac{1}{2}$ to 2 times the theoretical amount of water required to form the trihydrate of calcium hypochlorite.

10. The method of producing calcium hypochlorite which comprises forming an aqueous solution of hypochlorous acid containing chlorides, extracting the hypochlorous acid from such aqueous solution without separating the chlorides and combining the extract with hydrated lime to form calcium hypochlorite, the extract being used in excess of the amount required theoretically to react with all of the lime.

In testimony whereof we affix our signatures.

MAURICE C. TAYLOR.
ROBERT B. MacMULLIN.
RALPH E. GEGENHEIMER.